(12) United States Patent
Lake et al.

(10) Patent No.: US 7,061,501 B1
(45) Date of Patent: Jun. 13, 2006

(54) RENDERING A PENCIL-SKETCH IMAGE

(75) Inventors: Adam T. Lake, Beaverton, OR (US); Marc S. Blackstein, Hillsboro, OR (US); Carl S. Marshall, Portland, OR (US); Daniel Johnston, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 681 days.

(21) Appl. No.: 09/708,230

(22) Filed: Nov. 7, 2000

(51) Int. Cl.
*G09G 5/00* (2006.01)

(52) U.S. Cl. .................... 345/582; 345/583; 345/585; 345/586; 345/588; 345/440; 345/426; 345/473

(58) Field of Classification Search ................ 345/426, 345/440, 582–588, 473
See application file for complete search history.

(56) References Cited

U.S. PATENT DOCUMENTS

| 4,600,919 | A | | 7/1986 | Stern | |
|---|---|---|---|---|---|
| 4,747,052 | A | | 5/1988 | Hishinuma et al. | |
| 4,835,712 | A | | 5/1989 | Drebin et al. | |
| 4,855,934 | A | | 8/1989 | Robinson | |
| 4,901,064 | A | * | 2/1990 | Deering | 345/426 |
| 5,124,914 | A | | 6/1992 | Grangeat | |
| 5,163,126 | A | | 11/1992 | Einkauf et al. | |
| 5,371,778 | A | | 12/1994 | Yanof et al. | |
| 5,611,030 | A | | 3/1997 | Stokes | |
| 5,731,819 | A | | 3/1998 | Gagne et al. | |
| 5,757,321 | A | * | 5/1998 | Billyard | 345/426 |
| 5,786,822 | A | * | 7/1998 | Sakaibara et al. | 345/582 |
| 5,805,782 | A | * | 9/1998 | Foran | 345/426 |
| 5,809,219 | A | | 9/1998 | Pearce et al. | |
| 5,812,141 | A | * | 9/1998 | Kamen et al. | 345/587 |
| 5,847,712 | A | * | 12/1998 | Salesin et al. | 345/582 |
| 5,894,308 | A | | 4/1999 | Isaacs | |
| 5,929,860 | A | | 7/1999 | Hoppe | |
| 5,933,148 | A | | 8/1999 | Oka et al. | |
| 5,949,969 | A | * | 9/1999 | Suzuoki et al. | 358/1.17 |
| 5,966,133 | A | | 10/1999 | Hoppe | |
| 5,966,134 | A | * | 10/1999 | Arias | 345/589 |
| 5,974,423 | A | | 10/1999 | Margolin | |
| 6,054,999 | A | | 4/2000 | Strandberg | |
| 6,057,859 | A | | 5/2000 | Handelman et al. | |
| 6,078,331 | A | | 6/2000 | Pulli et al. | |
| 6,115,050 | A | | 9/2000 | Landau et al. | |
| 6,175,655 | B1 | | 1/2001 | George, III et al. | |
| 6,191,787 | B1 | | 2/2001 | Lu et al. | |
| 6,191,796 | B1 | | 2/2001 | | |
| 6,198,486 | B1 | | 3/2001 | Junkins et al. | Tarr |

(Continued)

OTHER PUBLICATIONS

Gershon Elber. Interactive Line Art Rendering of Freeform Surfaces. In Computer Gmphics Forwn. pp. 1–12. Eurographics '99 Conference issue.

(Continued)

*Primary Examiner*—Matthew C. Bella
*Assistant Examiner*—Po-Wei Chen
(74) *Attorney, Agent, or Firm*—Fish & Richardson P.C.

(57) ABSTRACT

A pencil-sketch image is rendered from three-dimensional (3D) data by determining a pencil-sketch texture for a polygon defined by the 3D data, projecting the polygon onto a two-dimensional surface, and mapping the pencil-sketch texture onto the polygon to render the pencil-sketch image. The pencil-sketch texture is determined by obtaining a value based on a normal vector to the polygon and a light vector between the polygon and a light source, classifying the polygon based on the value, and associating the pencil-sketch texture with the polygon based on the classification of the polygon.

30 Claims, 9 Drawing Sheets

U.S. PATENT DOCUMENTS

| | | | |
|---|---|---|---|
| 6,201,549 B1 * | 3/2001 | Bronskill | 345/441 |
| 6,208,347 B1 | 3/2001 | Migdal et al. | |
| 6,219,070 B1 | 4/2001 | Baker et al. | |
| 6,239,808 B1 * | 5/2001 | Kirk et al. | 345/582 |
| 6,252,608 B1 | 6/2001 | Snyder et al. | |
| 6,262,737 B1 | 7/2001 | Li et al. | |
| 6,262,739 B1 | 7/2001 | Migdal et al. | |
| 6,292,192 B1 | 9/2001 | Moreton | |
| 6,317,125 B1 | 11/2001 | Persson | |
| 6,337,880 B1 | 1/2002 | Cornog et al. | |
| 6,388,670 B1 | 5/2002 | Naka et al. | |
| 6,405,071 B1 | 6/2002 | Analoui | |
| 6,437,782 B1 | 8/2002 | Pieragostini et al. | |
| 6,478,680 B1 * | 11/2002 | Yoshioka et al. | 463/43 |
| 6,559,848 B1 | 5/2003 | O'Rourke | |
| 6,593,924 B1 | 7/2003 | Lake et al. | |
| 6,593,927 B1 | 7/2003 | Horowitz et al. | |
| 6,608,627 B1 | 8/2003 | Marshall et al. | |
| 6,608,628 B1 | 8/2003 | Ross et al. | |
| 2001/0026278 A1 | 10/2001 | Arai et al. | |
| 2002/0101421 A1 | 8/2002 | Pallister | |

OTHER PUBLICATIONS

Wolfgang Heidrich and Hans–Peter Seidel. Realistic, Hardware accelerated Shading and Lighting In Proceedigs of ACM SIGGRAPH 99, pp. 171–178, 1999.

Sousa et al., "Computer Generated Graphite Pencil Renderings of 3D Polygonal Models In Computer Graphics Forum", Eurographics pp. 195–207. '99 Conference issue.

Alliez et al., "Progressive Compression for Lossless Transmission of Triangle Meshes," ACM SIGGRAPH 2001, pp. 195–202 (2001).

Appel, Arthur, "The Notion of Quantitative Invisibility and the Machine Rendering of Solids." Proceedings of 22nd National Conference Association for Computing Machinery 1967.

Baja et al., "Progressive Compression and Transmission of Arbitrary Triangular Meshes," IEEE, pp. 307–316 (1999).

Buck et al., "Performance–Driven Hand Drawn Animation", ACM (NPAR2000), pp. 101–108 (2000).

Catmull et al., "Recursively Generated B–Spline Surfaces on Arbitrary Topological Meshes," Computer Aided Design, 10(6):350–355 (1978).

Chow, M., "Optimized Geometry Compression for Real–time Rendering,"IEEE, pp. 347–354 (1997).

Coelho et al., "An Algorithm for Intersecting and Trimming Parametric Meshes", ACM SIGGRAPH, pp. 1–8 (1998).

Cohen–Or, D. et al., "Progressive Compression of Arbitrary Triangular Meshes," IEEE Visualization 99 Conference Proc., pp. 67–72 (1999).

Deering, M., "Geometry Compression," *Computer Graphics*. SIGGRAPH '95, pp. 13–20, 1995.

DeRose et al., "Subdivisional Surfaces in Character Animation", ACM, SIGGRAPH'98, pp. 85–94 (1998).

Dyn, N. et al., "A Butterfly Subdivision Scheme for Surface Interpolation with Tension Control," *ACM Transactions on Graphics*, 9(2):160–169 (1990).

Elber, Gershom "Line Art Rendering via a Coverage of Isoperimetric Curves," IEEE Transactions on Visualization and Computer Graphics, 1(3); 231–239 (1995).

Elber, Gershon, "Interactive Line Art Rendering of Freeform Surfaces", *Eurographic'99*, 18(3):C1–C12 (1999).

Gooch et al., "A Non–Photorealistic Lighting Model for Automatic Technical Illustration," *Computer Graphics Proceedings, Annual Conference Series*, SIGGRAPH'98, pp. 447–452 (1998).

Gooch et al., "Interactive Technical Illustration," *ACM Interactive 3D*, pp. 31–38 (1999).

Heidrich et al., "Realistic, Hardware–Accelerated Shading and Lighting," *ACM*, (SIGGRAHP'99), pp. 171–178 (1999).

Hoppe, H., "Progressive Meshes," URL: http://www.re-search.,microsft.com/research/graphics/hoppe/, (10 pgs.).

Hoppe, H., "Efficient Implementation of Progressive Meshes," Comput.& Graphics, 22(1), pp. 27–36 (1998).

Hoppe, H., "View–Dependent Refinement of Progressive Meshes", URL: http://www.research.microsoft.com/~hoppe/ (10 pgs.).

Kumar et al., "Interactive Display of Large Scale NURBS Models", *ACM*, Symp. On Interactive 3D Graphics, pp. 51–58 (1995).

Lake et al., "Stylized Rendering Techniques for Scalable Real–Time 3D Animation", NPAR, pp. 101–108 (2000).

Lander, Jeff, "Making Kine More Flexible," Game Developer Magazine, 5 pp., Nov. 1998.

Lander, Jeff, "Skin Them Bones," Game Developer Magazine, 4 pgs. May 1998.

Lansdown et al., "Expressive Rendering: A Review of Nonphotorealistic Techniques," IEEE Computers Graphics & Applications, pp. 29–37 (1995).

Lasseter, J. et al., "Principles of Traditional Animation Applied to 3D Computer Animation," *ACM*, pp. 35–44 (1987).

Lee, M. et al., "Navigating Through Triangle Meshes Implemented as Linear Quadtrees," *ACM Transactions on Graphics*, 19(2):79–121 (2000).

Lewis, J.P. et al., "Pose Space Deformation: A Unified Approach to Shape Interpolation and Skeleton–Driven Deformation," *ACM*, (SIGGRAPH 2000), pp. 165–172 (2000).

Ma et al., "Extracting Feature Lines for 3D Unstructured Grids," IEEE, pp. 285–292 (1997).

Markosian, L. et al., "Real–Time Nonphotorealistic Rendering," SIGGRAPH'97, 6 pgs. (1997).

Pajarola et al., "Compressed Progressive Meshes" *IEEE Transactions on Visualization and Computer Graphics*, 6(1):79–93 (2000).

Pedersen, "A Framework for Interactive Texturing on Curved Surfaces", *ACM*, pp. 295–301 (1996).

"pmG Introduces Messiah: Animate 3.0", URL: http://www.digitalproducer.com/aHTM/Articles/jul_2000/july_17_00/pmg_intros _messiah_animate.htm (Accessed Oct. 26, 2004) 2 pgs.

Popovic et al., "Progressive Simplical Complexes" Microsoft Research, http://www.research.microsft.com/~hoppe/.

Pueyo, X. et al., "Rendering Techniques '96, " Proc. of Eurographics Rendering Workshop 1996, EUROGRAHICA, pp. 61–70 (1996).

Raskar, R. et al., "Image Precision Silhouette Edges," Symposium on Interactive 3D Graphics, ACM, pp. 135–231 (1999).

Rockwood, A. et al., "Real–time Rendering of Trimmed Surfaces," Computer Graphics (SIGGRAPH '89 Proceedings) 23:107–116 (1989).

Sousa, M., et al., "Computer–Generated Graphite Pencil Rendering of 3–D Polygonal Models", Europgraphics'99, 18(3):C195–C207 (1999).

Stam, J., "Exact Evaluation of Catmull–Clark Subdivision Surfaces at Arbitrary Parameter Values"SIGGRAPH 98 Conference Proceedings, Annual Conference Series, pp. 395–404 (1998).

Taubin et al., "3D Geometry Compression", SIGGRAPH'98 Course Notes (1998).

Taubin et al., "Progressive Forest Spilt Compression," IBM T.J. Watson Research Center, 9 pgs. (1998).

Thomas (Contributor) et al., "The Illusion of Life: Disney Animation " 47–51.

Wilhelms, J. & Van Gelder, A., "Anatomically Based Modeling," Univ. California Santa Cruz [online], 1997 [retrieved Dec. 22, 2004], retrieved from the Internet:<URL:http://graphics.stanford.edu/courses/cs448–01–spring/papers/wilhelms.pdf>.

Zelenik et al., "Sketch: An Interface for Sketching 3D Scenes"Brown University site of the NSF Science and Technology Center for Computer Graphics and Scientific Visualization, 1996.

Zorin "Interpolation Subdivision for Meshes With Arbitrary Topology" Department of Computer Science, California Institute of Technology, Pasadena CA.

* cited by examiner

 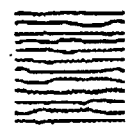 
FIG. 6        FIG. 7        FIG. 8
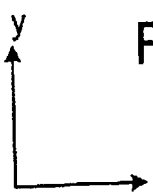
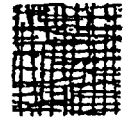  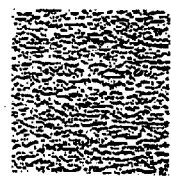
FIG. 9        FIG. 10       FIG. 11

RENDERING A PENCIL-SKETCH IMAGE

TECHNICAL FIELD

This invention relates to rendering a pencil-sketch image from three-dimensional (3D) data.

BACKGROUND

A pencil-sketch image approximates shading and depth by varying the placement and density of discrete line segments. Unlike traditional "smooth", or Gouraud, shading where transitions between light and dark regions of an image are gradual, pencil-sketching uses hard edge boundaries between regions. That is, transitions between regions are created by terminating line segments in the regions, not by blending one neighboring region into another region.

DESCRIPTION OF THE DRAWINGS

FIGS. 6 to 10 shows textures used for the pencil-sketch image.

FIG. 11 shows a background for the pencil-sketch image.

DESCRIPTION

Figure 1:
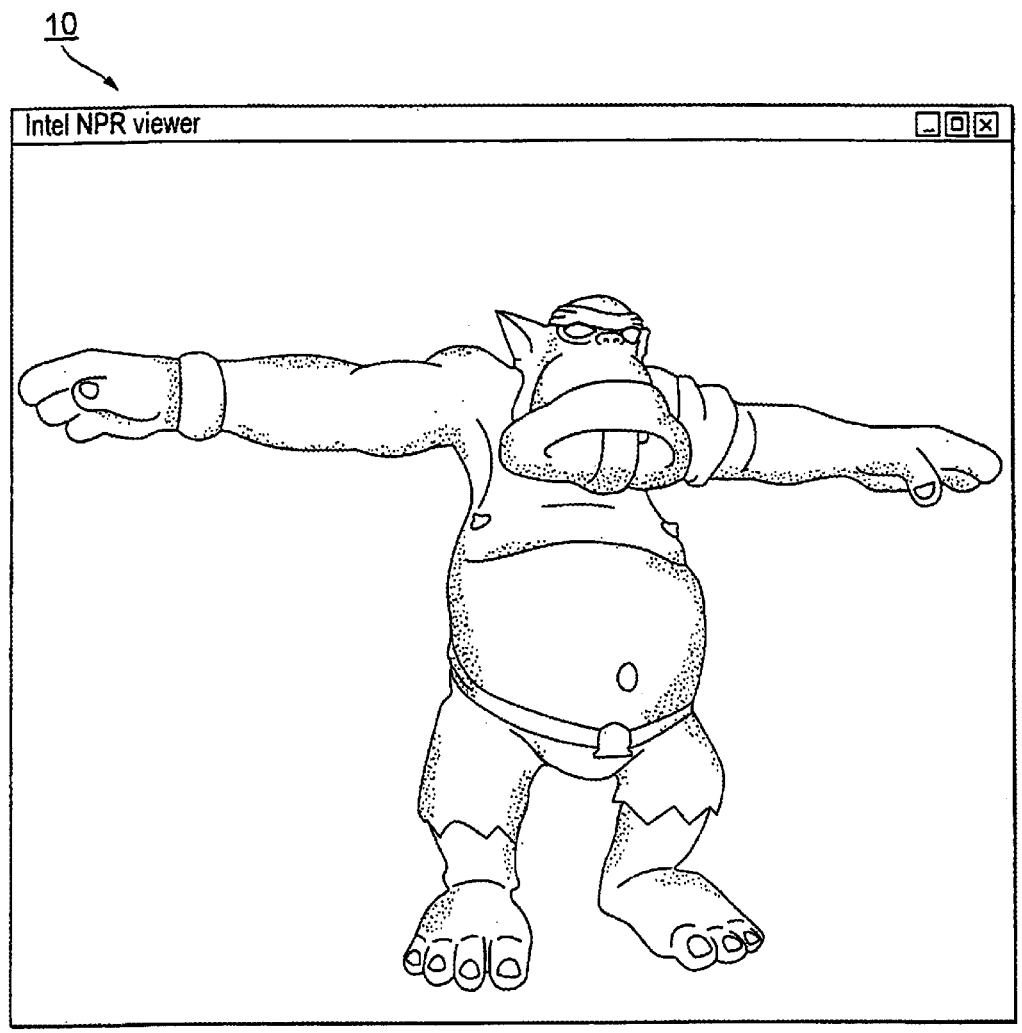
FIG. 1 is a view of a Gouraud-shaded 3D model.
Figure 2:
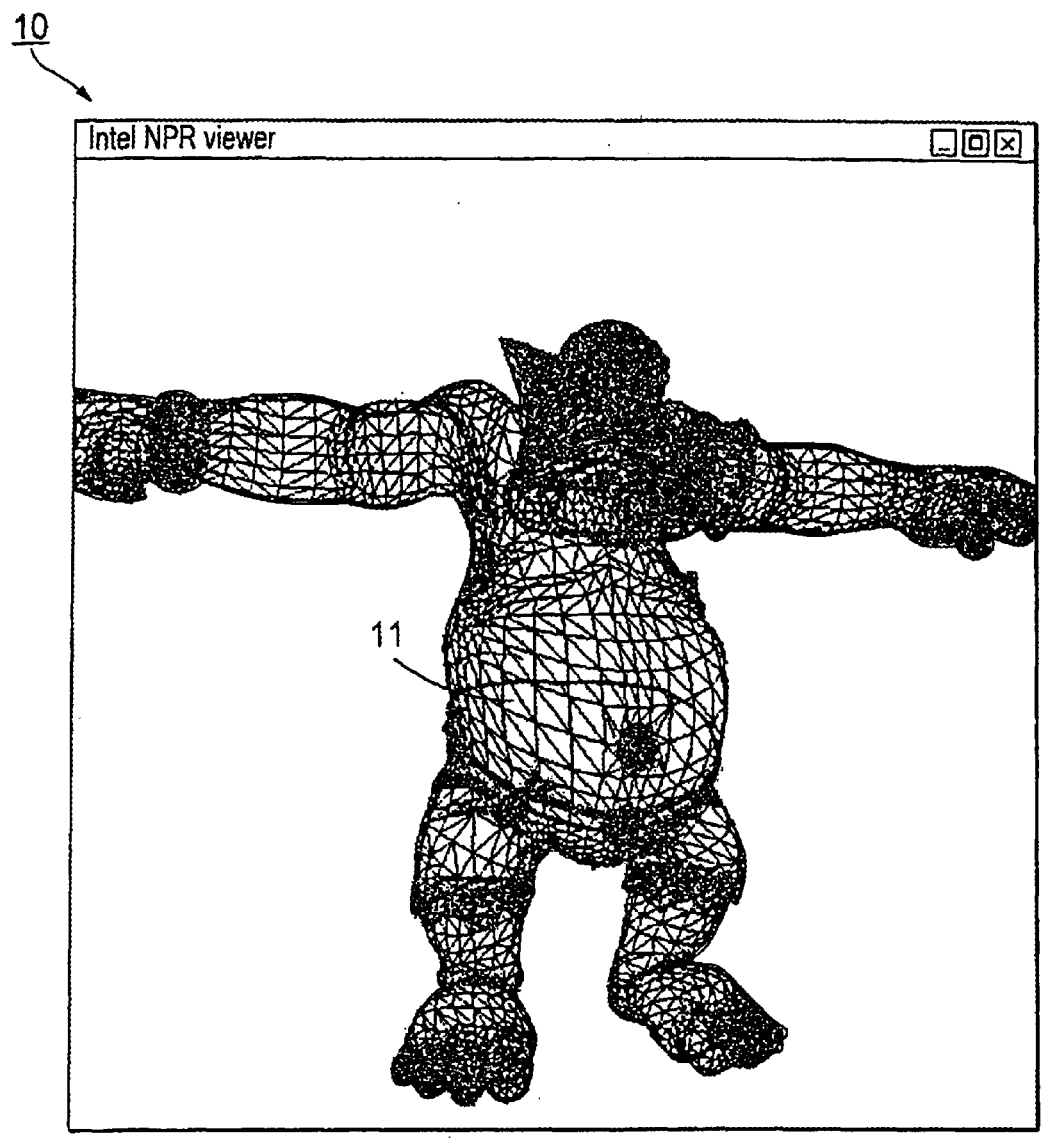
FIG. 2 is a wireframe view of polygons in the 3D model.

FIG. 1 shows a 3D model 10. 3D model 10 is a Gouraud-shaded model defined by 3D data. As shown in FIG. 2, the 3D data defines interconnecting polygons 11, which comprise 3D model 10. Polygons 11 are triangles in this embodiment; however, other types of polygons may be used to construct the 3D model. Groups of polygons are organized into meshes, each of which corresponds to an element of the 3D model.

Figure 3:
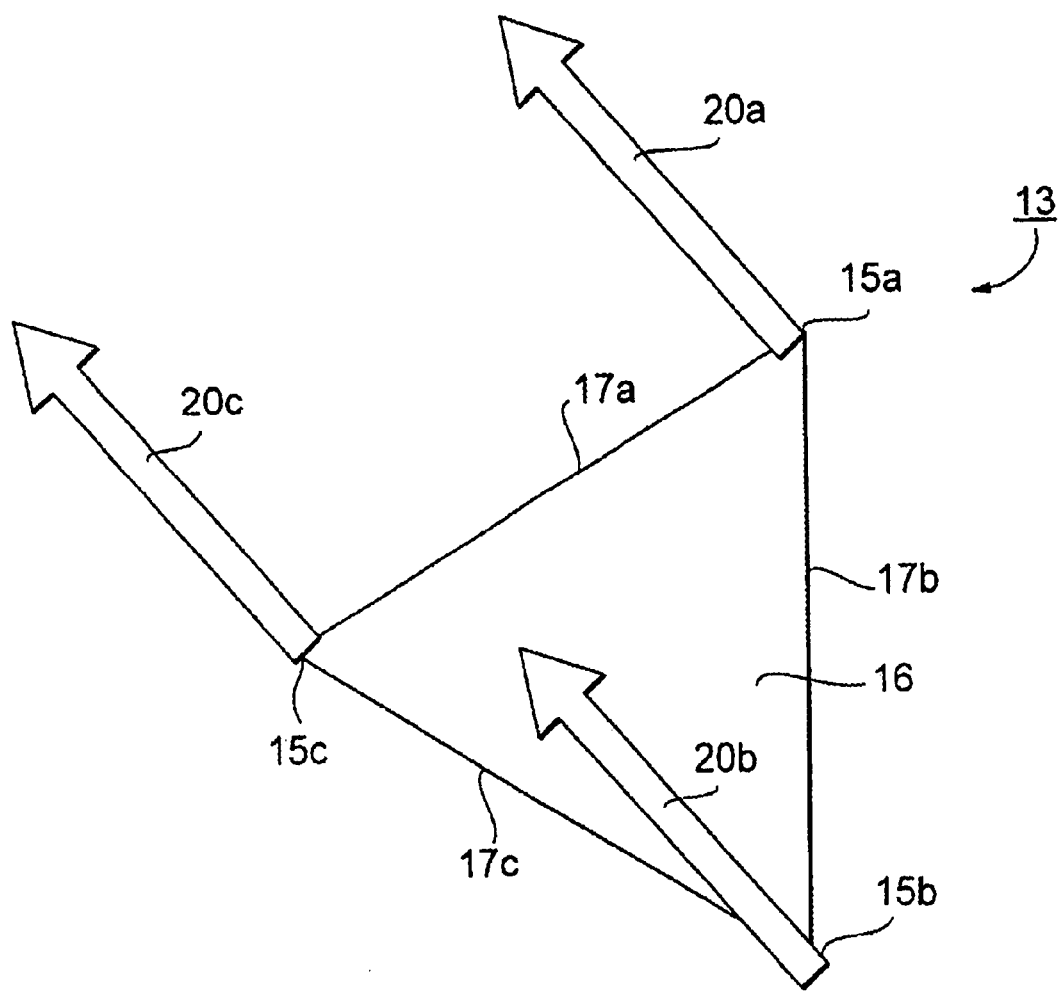
FIG. 3 is a view of one of the polygons.

Referring to FIG. 3, the 3D data for a polygon 13 is comprised of coordinates for three vertices 15a, 15b and 15c positioned in Cartesian XYZ (or other) space. These vertices define a face 16 and edges 17a, 17b and 17c for the polygon.

Figure 4:
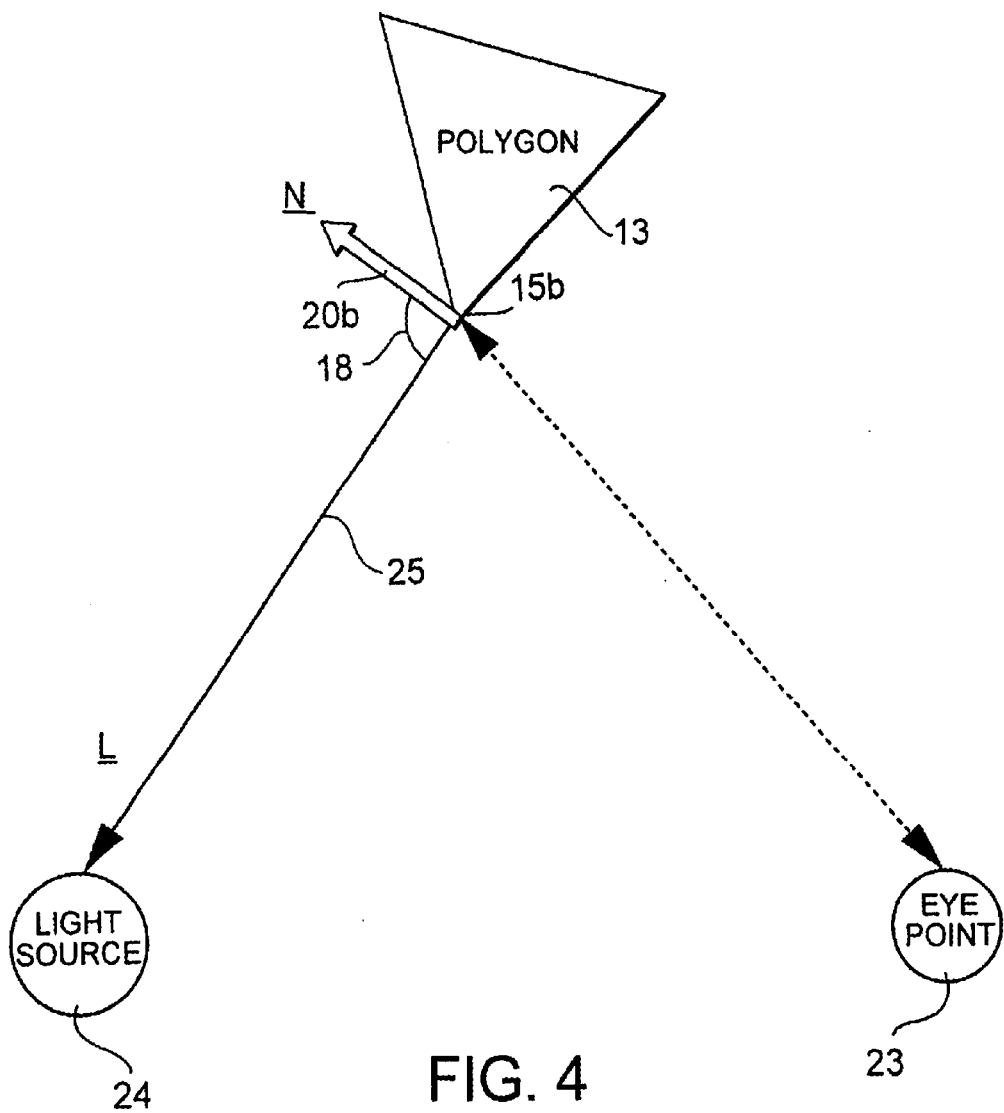
FIG. 4 is a view of light hitting the polygon.

A unit normal vector ("normal") 20a, 20b and 20c at each respective vertex 15a, 15b and 15c affects how the vertex is perceived relative to a predefined reference point (the "eyepoint") 23 (FIG. 4) in the "virtual world" that 3D model 10 inhabits. Taking vertex 15b as an example in FIG. 4, normal 20b determines the amount of light that reaches vertex 15b from a predefined light source 24 in the virtual world. The amount of light is determined using the dot product of unit normal 20b and a unit vector 25 from the light source. The dot product value defines the cosine of angle 18 between the light and the normal. The shading applied to each polygon face is determined based on this angle, as described below. Coordinates for the normals may be stored with the 3D data for each vertex. Alternatively, a normal may be computed "on-the-fly" during pencil-sketch image rendering.

Figure 5:
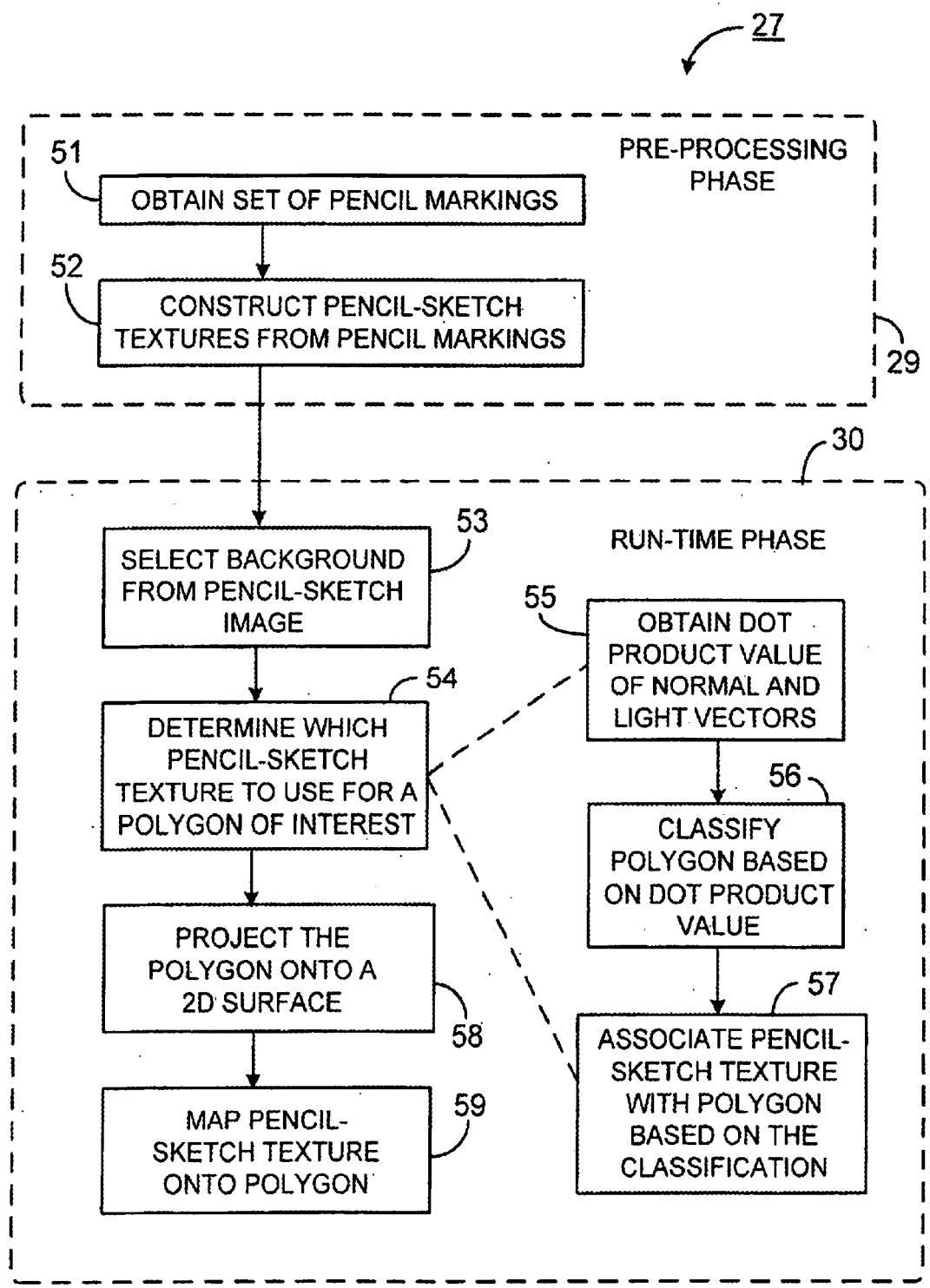
FIG. 5 is a flowchart of a process for generating a pencil-sketch image from the polygon.

FIG. 5 shows a process 27 for rendering pencil-sketch images from a 3D model. There are two phases to process 27: a pre-processing phase 29 and a run-time phase 30.

In pre-processing phase 29, process 27 obtains (51) a set of "pencil" markings. The pencil markings are bitmap images of line segments that may be scanned-in, read from a disk, retrieved from memory, or generated dynamically. The pencil markings may be straight, curved, or crooked. Also, the pencil markings may be of varying thickness and length, depending upon the type of textures that they are used to construct.

Process 27 constructs (52) a set of N (N≧1) 2D textures by selecting pencil markings and arranging them uniformly to create various texture maps/tiles. The pencil markings are arranged at different densities and are parallel and/or perpendicular to one another to create different textures. FIGS. 6 to 10 shows different types of textures that were constructed by arranging pencil markings.

In FIG. 6, the pencil markings are arranged at a low density and only in the Cartesian X-coordinate direction. FIGS. 7 and 8 show higher density versions of the texture shown in FIG. 6. In FIG. 9, the pencil markings are arranged in both the Cartesian X and Y directions (i.e., the pencil markings are cross-hatched) and at a relatively high density. FIG. 10 shows a higher-density version of the texture of FIG. 9. More, less and/or different textures may be used with process 27. For example, a blank texture, which includes no pencil sketch markings, may be used. Since the textures are tiled, the textures may be constructed so that there is continuity between the end point of a line segment on one tile and the start point of a line segment on an adjacent tile. Thus, when creating the line segments, it is preferable to ensure that the $C_0$ continuity property holds, where the $C_0$ continuity property is defined as having the tangent vectors of two curve segments be equal (in both direction and magnitude) at the segments' joint (or intersection) point.

However, this does not always alleviate the appearance of tiling; accordingly, the line segments may be created to ensure that the $C_1$ continuity property holds, in which the first derivatives (slopes) of the segments at the start and end points of adjacent tiles are roughly equal. This can be difficult to achieve, but can be simulated by randomly selecting the starting point for a line segment and wrapping the line segment around the texture at the end of the tile.

Pre-processing phase 29 set forth above may be performed at any time prior to run-time phase 30. It is noted that a single pre-processing phase may be used to store textures for several different run-time phases.

In run-time phase 30, process 27 selects (53) a background onto which a pencil-sketch image is to be rendered. The background may be selected from a set of backgrounds stored in memory or it may be obtained from another source, such as a disk or a scanned image. The background is an orthographic projection of a relatively large quadrilateral texture mapped with a paper (or other) texture. FIG. 11 shows an example of a background; however, other backgrounds, or even no background, may be used with process 27.

When rendering a pencil-sketch image from 3D polygon data, process 27 determines (54) which pencil-sketch texture to use for the polygon. Process 27 does this based on the way that the polygon is illuminated, i.e., based on the light that hits the polygon. To determine how light hits a polygon, process 27 obtains (55) a texture value using the vertex normals (see FIG. 3). For polygon 13 (FIG. 4), process 27 calculates the vector dot product of unit normal vector 20b (N) and unit light vector 25 (L).

Since N and L are both unit vectors the product of N·L is the cosine of the angle 18 formed between the two vectors. If the angle between N and L is small, then the diffuse component of smooth shading is high and N·L will have a value close to one. On the other hand, if the angle is large, then the amount of diffuse component in smooth shading is low and N·L has a value close to zero.

Process 27 takes the maximum of the resulting dot product (N·L) and zero, i.e., Max(N·L,0) and defines that value as the texture value for the vertex, in this case vertex 20b of polygon 13. The maximum is taken to discount polygons that are in the back of the 3D model relative to the light source and, thus, produce a negative N·L value.

For each vertex 20a, 20b and 20c of polygon 13, process 27 obtains (55) a texture value. Process 27 classifies (56) the polygon based on the obtained texture values. Process 27 uses the texture values to associate each vertex of polygon 13 with one of M (M≧1) bins in memory, each of which corresponds to a predetermined range of values. For example, a system might include three bins having intervals of [0,a], (a,b] and (b,1], where "a" and "b" are adjustable values with a<b, 0≦a and b≦1, and where square brackets indicate exclusion and parenthetic brackets indicate exclusion, e.g., "a" is included in the range [0,a] but excluded from the range (a,b]. So, in this example, if a texture value of vertex 20b is "a", vertex 20b will be associated with bin [0,a]. Different numbers and/or ranges of bins may be used in process 27.

Process 27 associates (57) one of the N pencil sketch textures from FIGS. 6 to 10 with polygon 13 based on the classifications of the polygon's vertices. Process 27 builds n (n≧1) face lists in memory, each of which corresponds to one of the N textures ("N" here is not necessarily equal to "n"), and assigns polygon 13 to one of those face lists based on the bins into which the polygon's vertices fall. For polygon 13, if each vertex 20a, 20b and 20c falls in the same bin, the polygon is appended to a face list that correlates to the bin. If different vertices of polygon 13 fall into different bins, then the polygon is appended to the most appropriate face list. For example, if two vertices belong to the same bin, but one other vertex does not, the polygon may be appended to the face list for that bin despite the other vertex.

Figure 12:
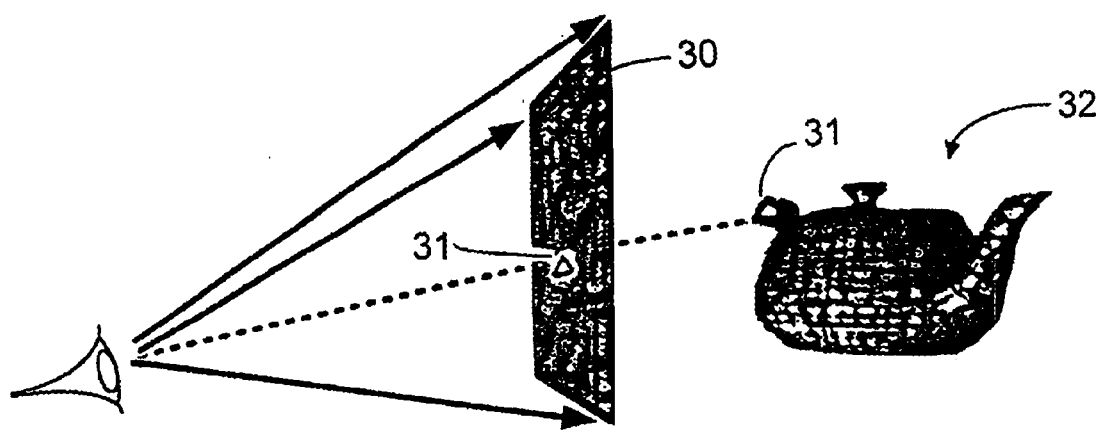
FIG. 12 is a view showing how a perspective of a 3D model is mapped onto a two-dimensional (2D) surface.

Once process 27 determines (54) the texture for polygon 13, process 27 projects (58) polygon 13 onto a 2D surface. Referring to the example shown in FIG. 12, this is done by determining the XY coordinates on 2D surface 30 (e.g., a computer monitor) of a polygon 31 on 3D model 32. Process 27 projects the coordinates of the polygon onto 2D surface 30, resulting in a 2D representation of the polygon.

Figure 13:
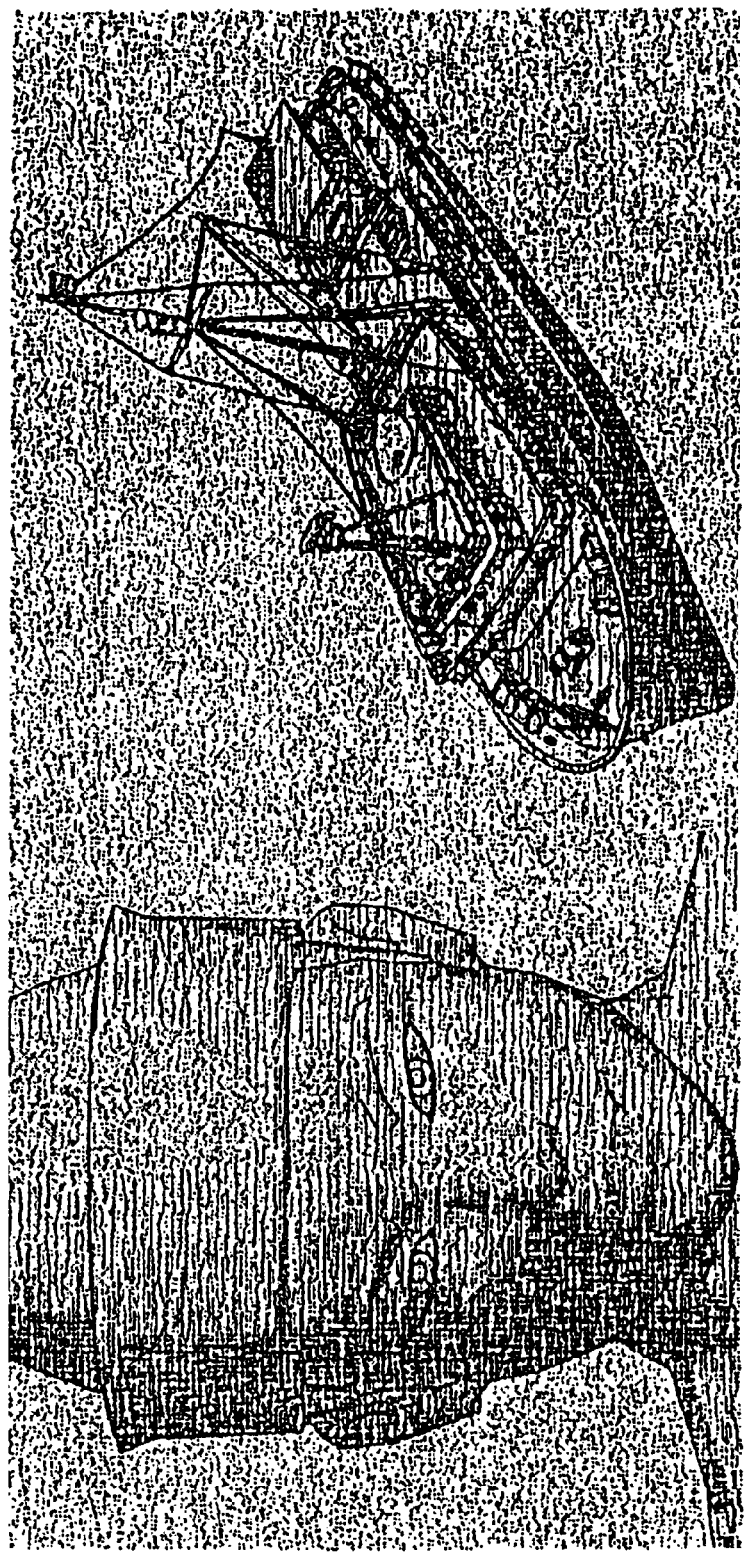
FIG. 13 shows two pencil-sketch images rendered by the process of FIG. 5.

Referring back to FIG. 5, process 27 maps (59) the appropriate texture onto the 2D representation of polygon 13. As noted, the texture of polygon 13 is determined based on the face list to which polygon 13 is appended. Process 27 is repeated for each polygon in a 3D model, resulting in a pencil-sketch image of the 3D model. Examples of pencil-sketch images generated by process 27 are shown in FIG. 13.

Process 27 may be used to create animation cels for cartooning. For example, a 3D model, such as model 10, may be generated, and then positioned in a desired manner. Process 27 may be executed on the model to produce a pencil-sketch 2D image for that position. Then, the 3D model 10 can be repositioned (e.g., rotated), and process 27 executed on the repositioned model to produce a pencil-sketch 2D image for a different perspective of the model. This process may be repeated to produce pencil-sketch 2D images for any number of model positions. Thus, process can generate animation cels automatically, meaning without the use of hand-drawn sketches.

Process 27 runs in real-time, which facilitates the animation process. That is, in conventional hand-drawn animation, artists cannot interactively change the appearance/view of a character without re-drawing the character manually. Process 27 permits this because it renders frames of animation (i.e., 2D images) dynamically and automatically for a given viewpoint in real-time. In this regard, the viewpoint is not the only aspect of a frame that can be dynamically manipulated using process 27. Light moving relative to a character and model changes the locations of shadows on those objects, just as in a conventional 3D Gouraud-shaded scene.

Process 27 can be used for interactive technical illustrations and real-time video game play. For example, a pencil-sketch game may be constructed in which a user navigates throughout a virtual world that appears in 2D, e.g., a world that simulates a newspaper comic. So-called "How-To" manuals, particularly the online variety, often make use of pencil-sketch drawings to illustrate aspects of a model. Process 27 may be used to allow a reader to examine the model from different angles/perspectives.

Figure 14:
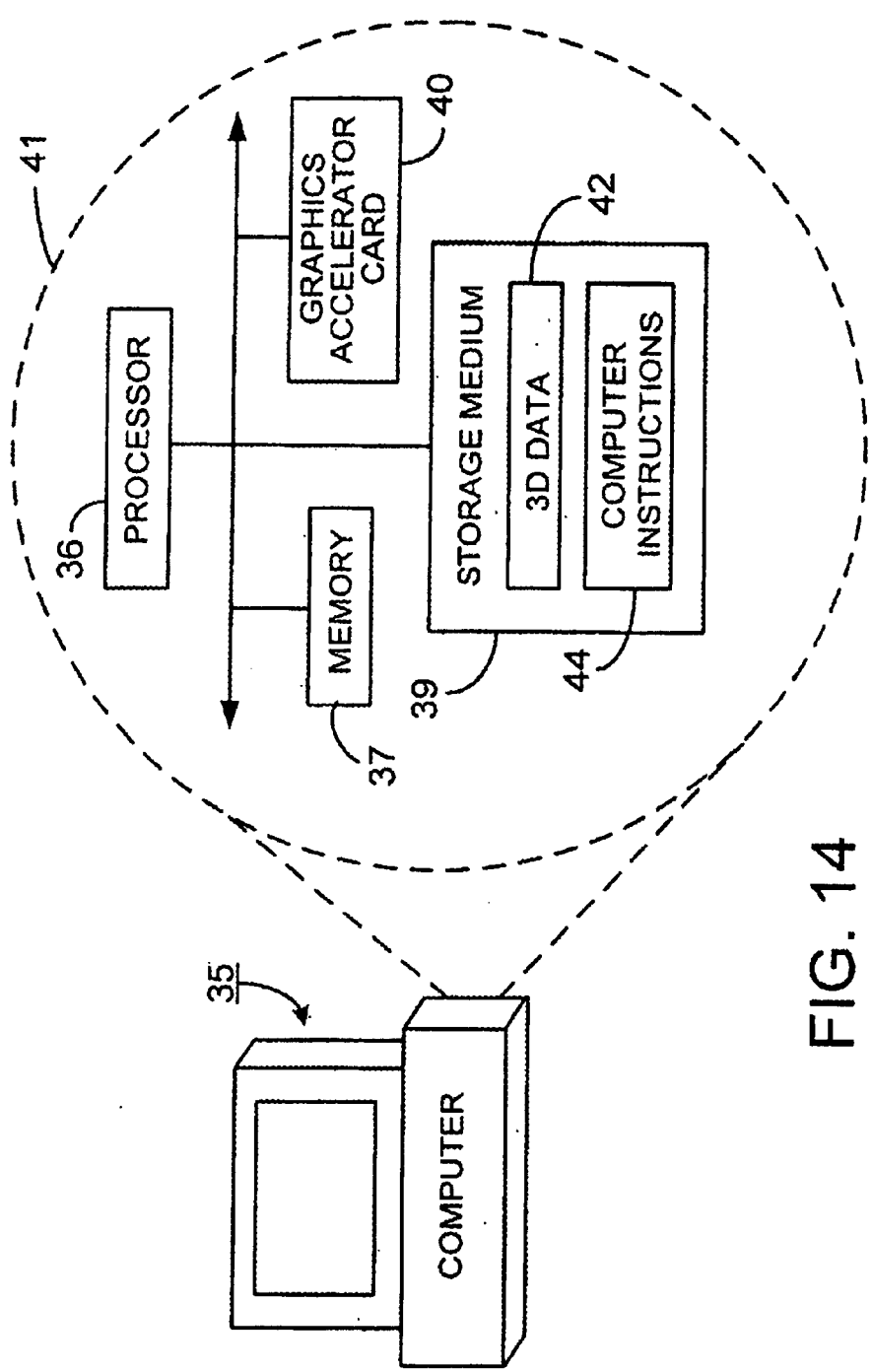
FIG. 14 is a block diagram of a computer system on which the process of FIG. 5 may be implemented.

FIG. 14 shows a computer 35 for rendering pencil-sketch images using process 27. Computer 35 includes a processor 36, a memory 37, a storage medium 39 (e.g., a hard disk), and a 3D graphics accelerator card 40 for repositioning a 3D model and manipulating 3D data (see view 41). Storage medium 39 stores 3D data 42 which defines a 3D model, and computer instructions 44 which are executed by processor 36 out of memory 37 to render pencil-sketch images using process 27 and 3D data 42. Memory 37 also stores the face lists and bins noted above.

Process 27 is not limited to use with the hardware and software of FIG. 14; it may find applicability in any computing or processing environment and with any type of machine that is capable of running a computer program. Process 27 may be implemented in hardware, software, or a combination of the two. Process 27 may be implemented in computer programs executing on programmable computers that each include a processor, a storage medium readable by the processor (including volatile and non-volatile memory and/or storage elements), at least one input device, and one or more output devices. Program code may be applied to data entered using an input device to perform process 27 and to generate output information.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform process 27. Process 27 may also be implemented as a computer-readable storage medium, configured with a computer program, where, upon execution, instructions in the computer program cause the computer to operate in accordance with process 27.

Other embodiments not described herein are also within the scope of the following claims.

What is claimed is:

1. A method of rendering a pencil-sketch image from three-dimensional data, comprising:
   determining a pencil-sketch texture for a polygon defined by the three-dimensional data, wherein the pencil-sketch texture is comprised of tiles, and wherein determining the pencil sketch texture comprises obtaining texture values for vertices of the polygon and, in a case where all vertices do not have the same texture value, assigning the pencil-sketch texture to the polygon based on a texture value of a majority of the vertices of the polygon;
   projecting the polygon onto a two-dimensional surface; and
   mapping the pencil-sketch texture onto the polygon to render the pencil-sketch image, wherein mapping comprises arranging the tiles so that there is substantial continuity between pencil-sketch markings in selected tiles, and wherein the substantial continuity is determined based on at least one of tangents to the pencil-sketch markings in the selected tiles and approximations of derivatives of the pencil-sketch markings in the selected tiles, the approximations being obtained by wrapping the pencil sketch marking in the selected tiles around edges of the selected tiles.

2. The method of claim 1, further comprising:
   obtaining a set of pencil-sketch markings; and
   constructing the pencil-sketch texture using the pencil-sketch markings.

3. The method of claim 2, wherein constructing comprises arranging the pencil sketch markings at a predetermined density such that the pencil sketch markings are at least one of parallel and perpendicular to one another.

4. The method of claim 1, further comprising:
   selecting a background onto which the pencil sketch image is rendered.

5. The method of claim 1, wherein each texture value is obtained based on a normal vector to the polygon and a light vector between the polygon and a light source; and
   assigning the pencil-sketch texture comprises:
      classifying the polygon based on a texture value for the polygon; and
      associating the pencil-sketch texture with the polygon based on the classification of the polygon.

6. The method of claim 5, wherein the normal vector is a vertex normal of the polygon.

7. The method of claim 5, wherein a texture value is obtained by calculating the vector dot product of the normal vector and the light vector.

8. The method of claim 5, wherein the polygon is classified by associating the polygon with one of M (M≧1) bins, each of the M bins corresponding to a predetermined range of values.

9. The method of claim 8, wherein the pencil-sketch texture is associated with the polygon based on which of the N bins into which the polygon falls.

10. The method of claim 1, wherein the three-dimensional data defines a three-dimensional model; and
    the method further comprises:
       re-positioning the three-dimensional model relative to the two-dimensional surface; and
       repeating determining, projecting and mapping for a second polygon on the three-dimensional model to render a second pencil-sketch image.

11. An article comprising:
    a readable medium that stores executable instructions to render a pencil-sketch image from three-dimensional data, the instructions for causing a machine to:
       determine a pencil-sketch texture for a polygon defined by the three-dimensional data, wherein the pencil-sketch texture is comprised of tiles, and wherein determining the pencil sketch texture comprises obtaining texture values for vertices of the polygon and, in a case where all vertices do not have the same texture value, assigning the pencil-sketch texture to the polygon based on a texture value of a majority of the vertices of the polygon;
       project the polygon onto a two-dimensional surface; and
       map the pencil-sketch texture onto the polygon to render the pencil-sketch image, wherein mapping comprises arranging the tiles so that there is substantial continuity between pencil-sketch markings in selected tiles, and wherein the substantial continuity is determined based on at least one of tangents to pencil-sketch markings in the selected tiles and approximations of derivatives of the pencil-sketch markings in the selected tiles, the approximations being obtained by wrapping the pencil sketch marking in the selected tiles around edges of the selected tiles.

12. The article of claim 11, further comprising instructions that cause the machine to:
    obtain a set of pencil-sketch markings; and
    construct the pencil-sketch texture using the pencil-sketch markings.

13. The article of claim 12, wherein constructing comprises arranging the pencil sketch markings at a predetermined density such that the pencil sketch markings are at least one of parallel and perpendicular to one another.

14. The article of claim 11, further comprising instructions that cause the machine to:
    select a background onto which the pencil sketch image is rendered.

15. The article of claim 11, wherein each texture value is obtained based on a normal vector to the polygon and a light vector between the polygon and a light source; and
    assigning the pencil-sketch texture comprises:
       classifying the polygon based on a texture value for the polygon; and
       associating the pencil-sketch texture with the polygon based on the classification of the polygon.

16. The article of claim 15, wherein the normal vector is a vertex normal of the polygon.

17. The article of claim 15, wherein a texture value is obtained by calculating the vector dot product of the normal vector and the light vector.

18. The article of claim 15, wherein the polygon is classified by associating the polygon with one of M (M≧1) bins, each of the M bins corresponding to a predetermined range of values.

19. The article of claim 18, wherein the pencil-sketch texture is associated with the polygon based on which of the N bins into which the polygon falls.

20. The article of claim 11, wherein the three-dimensional data defines a three-dimensional model; and
    the article further comprises instructions that cause the machine to:
       re-position the three-dimensional model relative to the two-dimensional surface; and
       repeat determining, projecting and mapping for a second polygon on the three-dimensional model to render a second pencil-sketch image.

21. An apparatus for rendering a pencil-sketch image from three-dimensional data, comprising:
 a memory that stores executable instructions; and
 a processor that executes the instructions to:
  determine a pencil-sketch texture for a polygon defined by the three-dimensional data, wherein the pencil-sketch texture is comprised of tiles, and wherein determining the pencil sketch texture comprises obtaining texture values for vertices of the polygon and, in a case where all vertices do not have the same texture value, assigning the pencil-sketch texture to the polygon based on a texture value of a majority of the vertices of the polygon;
  project the polygon onto a two-dimensional surface; and
  map the pencil-sketch texture onto the polygon to render the pencil-sketch image, wherein mapping comprises arranging the tiles so that there is substantial continuity between pencil-sketch markings in selected tiles, and wherein the substantial continuity is determined based on at least one of tangents to the pencil-sketch markings in the selected tiles and approximations of derivatives of the pencil-sketch markings in the selected tiles, the approximations being obtained by wrapping the pencil sketch markings in the selected tiles around edges of the selected tiles.

22. The apparatus of claim 21, wherein the processor executes instructions to:
 obtain a set of pencil-sketch markings; and
 construct the pencil-sketch texture using the pencil-sketch markings.

23. The apparatus of claim 22, wherein constructing comprises arranging the pencil sketch markings at a predetermined density such that the pencil sketch markings are at least one of parallel and perpendicular to one another.

24. The apparatus of claim 21, wherein the processor executes instructions to:
 select a background onto which the pencil sketch image is rendered.

25. The apparatus of claim 21, wherein each texture value is obtained based on a normal vector to the polygon and a light vector between the polygon and a light source; and
 assigning the pencil-sketch texture comprises:
  classifying the polygon based on the value; and
  associating the pencil-sketch texture with the polygon based on the classification of the polygon.

26. The apparatus of claim 25, wherein the normal vector is a vertex normal of the polygon.

27. The apparatus of claim 25, wherein a texture value is obtained by calculating the vector dot product of the normal vector and the light vector.

28. The apparatus of claim 25, wherein the polygon is classified by associating the polygon with one of M (M≧1) bins, each of the M bins corresponding to a predetermined range of values.

29. The apparatus of claim 28, wherein the pencil-sketch texture is associated with the polygon based on which of the N bins into which the polygon falls.

30. The apparatus of claim 21, wherein the three-dimensional data defines a three-dimensional model; and
 the processor executes instructions to:
  re-position the three-dimensional model relative to the two-dimensional surface; and
  repeat determining, projecting and mapping for a second polygon on the three-dimensional model to render a second pencil-sketch image.

* * * * *